United States Patent Office 2,889,198
Patented June 2, 1959

2,889,198

MANUFACTURE OF CYANATES

Fred O. Barrett, Springdale, Ohio, and Jonas Kamlet, New York, N.Y., assignors to Emery Industries, Inc., Cincinnati, Ohio, a corporation of Ohio No Drawing. Application October 1, 1956
Serial No. 612,970

2 Claims. (Cl. 23—75)

This invention relates to a process for the conversion of urea to metal cyanates.

The methods hitherto known for the conversion of urea to metal cyanates have included the fusion of urea with alkali metal carbonates and the reaction of urea or dicyandiamide with alcoholates as disclosed in United States Patent No. 2,563,044.

The fusion methods suffer the disadvantage of being readily operable only on low fusing point alkali carbonates. Operating at fusion temperatures also results in decomposition, the production of unwanted by-products, including the reduction of cyanate to cyanides and the difficulty of separating the products from the unreacted starting materials.

The use of alcoholates to produce cyanates from urea as disclosed in United States Patent No. 2,563,044 requires the use of alkali metals to produce the alcoholates. This is not only expensive but cyanate production is limited to sodium cyanate as the other alkali metals are not produced on a commercial scale.

It is the purpose of this invention to provide a process for the conversion of urea to alkali metal or alkaline earth metal cyanates which does not require the use of the free metal or high processing temperatures.

It is also the purpose of this invention to provide a method for the production of a variety of metal cyanates.

It is the further purpose of this invention to provide a process which permits the preparation of metal cyanates in high yield, of high purity and free from cyanides.

We have found that urea can be converted to metal cyanates in good yields and without the use of temperatures sufficiently high to produce fusion or the use of expensive free metals, providing certain operating principles are adhered to. We have found that excellent conversion of urea to cyanates can be attained when urea is reacted with an alkaline compound of a type such that water is not evolved as a by-product of the reaction. We have also found that the efficiency of conversion of urea to a metal cyanate is dependent upon obtaining an intimate admixture between the reacting ingredients.

There are various methods of conducting the reaction by which these principal objectives may be attained. The choice of the procedures to be used will be dependent upon the operating costs which can be justified and the yield and degree of purity of the cyanate desired for various end uses.

It is generally reported that aqueous alkaline solutions decompose urea with the liberation of ammonia and carbon dioxide and the formation of carbonates as end products. It has not been recognized that the formation of a cyanate may be an intermediate step and that the total decomposition may result from the rapid hydrolysis of the cyanate in the presence of water. Even the treatment of urea with hydroxides in non-aqueous systems can liberate sufficient water to bring about a substantial degree of hydrolysis of the cyanate resulting from the initial reaction.

We have found that the deleterious effects of water can be avoided by first forming the salts of alkali or alkaline earth metals with weakly acidic compounds whereby water is evolved and eliminated as a preliminary step. The reaction of the salts with urea may then be caused to proceed without the further evolution of water and the accompanying hydrolysis of cyanate. In all cases, the urea and the alkaline salts are used as mole equivalents, i.e. in mole equivalent quantities. By this it is meant that one mole of urea reacts with one mole of a salt of a monovalent metal to form one mole of cyanate or that two moles of urea react with one mole of a salt of a divalent alkaline metal to form one mole of cyanate.

The weakly acidic compounds which may be employed in the practice of our invention may be inorganic or organic. They should be sufficiently acidic in character to react with oxides or hydroxides of the alkaline or alkaline earth metals to form salts and thus avoid the use of the expensive free metals.

The acidic compounds, however, should not be so acidic that their salts are essentially neutral or non-alkaline in nature. Such salts either fail to react with the urea or if a reaction does occur the acid liberated by the reaction of the salt with the urea is strong enough to partly decompose the cyanates which are formed.

We have found that the salts of acids having ionization constants in the range of from $10^{-5}$ to $10^{-14}$ possess the desired characteristics. Salts of acidic compounds in the range of $10^{-7}$ to $10^{-12}$ are generally preferred as these salts are readily produced and at the same time the reaction with urea proceeds smoothly and completely.

Typical acidic materials include carbonic acid, hydrosulfuric acid, phenols and substituted phenols, 1 nitropropane, 2 nitrobutane, boric acid and the like. For convenience we shall hereafter refer to the salts of such suitable acids as alkaline salts.

The intimate admixture of the alkaline salts with urea may be attained by any one of several interrelated methods. We have found that urea can be converted to cyanate if the urea and alkaline salt are both finely divided and then mixed and heated together under conditions which maintain an intimate admixture.

A second method of conducting the reaction is to heat the urea and salt in the presence of a heat transfer or suspending medium such as a high boiling inert organic solvent. This modification involves the same principle used in the first method except that a liquid, which is more efficient, is employed as the heat transfer medium in place of air.

A third method of conducting the reaction involves the use of an organic liquid which is a solvent for urea in place of an organic liquid which merely serves as a heat transfer medium. By employing the urea in solution an even more intimate contact between the urea and the alkaline salt can be established.

A fourth method of conducting the reaction, which is particularly effective, requires the use of an organic solvent which is a solvent for urea and the selection of an alkaline salt which is also soluble in the same solvent. In all cases where an organic heat transfer medium or an organic solvent is employed it is essential that the organic medium should not be a solvent or at least only a very poor solvent for the metal cyanate which is being produced. However, it is not essential that the solvent be capable of dissolving all of the urea and all of the salt which are used in the reaction. Inasmuch as the solvent precipitates the cyanate as it is formed, a partial solvent may be used which continuously dissolves one or both of the components which enter into the reaction as the cyanate is formed and precipitated. Thus, for instance, a solvent may be chosen which is a good solvent for urea but a relatively poor solvent for the salt. The reaction proceeds to completion rapidly, nevertheless, because the urea and salt readily react in the solvent phase which precipitates cyanate and simultaneously dissolves more salt. Such a solvent may be termed a "partial solvent" if a component which enters into the reaction is not fully soluble therein.

The alkaline salts used in our process may be produced from the acidic compounds by conventional methods. However, if modifications of the process which involve the use of solvents are to be practiced, one convenient method of preparing the alkaline salts is to react the acidic material and the appropriate oxide or hydroxide in the solvent which is to be employed in the latter step of converting the urea to cyanate. This method is particularly useful in preparing organic alkaline materials such as sodium phenolate or sodium cresolate which are soluble in the organic solvents employed in the fourth modification as indicated above.

In carrying out the reaction of this invention, the alkaline salt and the urea are placed in a reaction vessel, together with the heat transfer medium or solvent if used, and heated to a temperature of from 100–200° C. until the evolution of ammonia ceases. If the reaction is to be carried out in the absence of a solvent, we find that as the reaction progresses the reaction mass will tend to partially melt and solidify. We find it desirable therefore to carry out what may be termed the "dry reaction" in a reacting vessel equipped with a powerful agitator or in a heated rotating reactor similar to a ball mill. Either device serves to break up any fused material which results at an intermediate point in the reaction. As the reaction proceeds the reacting mass again becomes powdery and the reaction can then be run to completion.

In carrying out the "dry reaction," it is desirable that the alkaline salt should be capable of being finely powdered but it is not required to possess any unusual solubility characteristics. We find, therefore, that carbonates or bicarbonates are very satisfactory and inexpensive alkaline salts for use in the "dry reaction." Since no solvents are employed, the expense of solvent recovery is avoided and the entire process can be carried out cheaply. The conversion of the urea to cyanate, however, may not be as complete as can be obtained by other methods of practicing the process of this invention. Final products consisting of 80% or more cyanate and 20% or less alkaline salt, usually carbonate, can be obtained and the product is completely free from any traces of cyanide. It can be used for any purpose where a minor content of carbonate is not deleterious.

In carrying out our reaction in the presence of a liquid medium, essentially the same procedure is employed whether the liquid medium be merely a heat transfer agent or is a solvent for one or both of the reacting ingredients. The urea and alkaline salt and the liquid employed are placed in a closed vessel equipped with an agitator and a reflux condenser. This mixture is heated at a temperature of from 100–200° C. with stirring until the evolution of ammonia ceases. The amount of liquid may constitute from 20% to 75–80% of the total charge. The minimum quantity is the amount necessary to provide a mixture which can be stirred readily, not only at the beginning of the reaction but also at the end of the reaction after the cyanate has been formed. Generally, an amount of liquid or solvent equal to approximately 50% by weight of the total charge is sufficient.

The time of heating is somewhat proportional to the temperature employed but the reaction is progressively more rapid when either one or both of the reactants is in solution. The time required, therefore, may range from as high as eighteen hours in the absence of a heat transfer medium to six hours in the presence of a liquid heat transfer agent and to as low as one hour when both reactants are in solution.

High boiling hydrocarbons provide cheap and convenient liquids for heat transfer purposes, for example, technical white oil may be used.

Solvents, which are solvents for urea are usually polar in nature and are preferably sufficiently high boiling that it is not necessary to carry out the reaction under pressure. Among the solvents which have been found suitable are the high boiling alcohols, ketones, ether alcohols, and amides. Such solvents include methyl isobutyl carbinol, di-isobutyl ketone, the diethyl ether of ethylene glycol, 2-ethylhexanol, the mono-methyl ether of diethylene glycol, dimethyl formamide and dimethyl acetamide.

The alkaline salts which are soluble in the solvents, and which comply with the requirements previously listed, include the phenolates, cresolates and the alkaline salts of the nitro paraffins such as nitropropane or nitrobutane. The phenolates or cresolates are generally preferred as they are readily prepared, provide a good rate of reaction and can be recovered for reuse.

At the completion of the reaction the cyanates, which have been precipitated, are separated from the solvents by filtration. The last traces of solvent may be removed from the recovered filter cake by washing with a small amount of a more volatile organic solvent. The product is then dried by any convenient means to insure complete freedom from solvent contamination.

The practice of our invention is more fully explained but is not limited by the following examples.

*Example No. 1.—Reaction using dry materials*

Mole equivalent weights of urea and sodium carbonate were ground together and then heated with stirring at a temperature of 105° to 110° C. for 10.5 hours. The temperature was then raised to 130° to 150° C. and the heating continued for an additional 7 hours.

The weight loss during the reaction was 92% of theory and the resulting powdery product contained 81.7% sodium cyanate and 9.5% sodium carbonate.

*Example No. 2.—Reaction in the presence of a heat transfer liquid*

53 gms. of $Na_2CO_3$ were added to white oil (350 gms.) and dispersed with stirring. The mixture was heated to 140–45° C. and 60 gms. of urea was added slowly. When the reaction started there was a temporary drop in temperature which was gradually raised back to 140–45° C. and the mix reacted for a period of four hours. $(NH4)_2CO_3$ collected in the water condenser as the reaction proceeded. The solids in the flask lumped somewhat and stuck to the sides and bottom of the glass vessel. At the end of four hours, the solids were scraped out, filtered, washed with ether, dried, ground, weighed and analyzed. 72 gms. of material (110% of theory) analyzing 71.3% NaOCN, 16.6% $Na_2CO_3$ were obtained. Function of the liquid appeared to be mainly as a dispersing medium.

*Example No. 3.—Reaction in the presence of a solvent for the urea*

All reactions except that with sodium sulfide were carried out by mixing the alkaline salt and the solvent, heating to the reaction temperature and then adding powdered urea. The heating was continued at the temperature and for the period of time indicated. At the end of the reaction period the resulting mixture of solvent and precipitated cyanate was cooled to room temperature, filtered and the filter cake washed with a small amount of solvent. The cake was then dried to remove traces of solvent and anlayzed.

In the reaction with sodium sulfide the sulfide and solvent were first heated until the water of crystallization had been evolved. The urea was then added and the remaining steps carried out as described above.

The results obtained with various inorganic salts and various solvents are shown below in tabular form:

INORGANIC ALKALINE SALTS [1] (Weights in grams)

| Salt | Na$_2$CO$_3$ | Na$_2$CO$_3$ | Na$_2$CO$_3$ | K$_2$CO$_3$ | Na$_2$S.9H$_2$O | Borax |
|---|---|---|---|---|---|---|
| Solvent | DMF | MIC | DIBK | DMF | DMF | MIC |
| Wt. Salt | 53 | 53 | 53 | 69 | 120 | 50 |
| Wt. Solvent | 300 | 300 | 300 | 300 | 150 | 200 |
| Wt. Urea | 60 | 60 | 60 | 60 | 60 | 30 |
| Max. Tem., °C | 150 | 135 | 157 | 148 | 150 | 138 |
| Time, Hours | 2 | 6 | 5 | 5 | 2½ | 3 |
| Percent Yield by Wt | 96 | 110 | 95 | 95 | 96 | 99 |
| Cyanate Cont., Percent | 92 | 62 | 91 | 97 | 88.5 | 69.4 |
| Percent Carbonate in Product | 4 | 11 | 6 | .7 | | Nil |

[1] Reaction incomplete, low temperature. DMF is dimethyl formamide; MIC is methyl isobutyl carbinol; DIBK is di-isobutyl ketone.

*Example No. 4.—Reaction in which both reactants are in solution*

(a) 162 grams of cresol were dissolved in 122.5 grams of methyl isobutyl carbinol. A solution of 60 grams (1½ moles) of NaOH in 60 grams of water (or dry flake NaOH may be used instead of 50% solution) was added to the phenol-methyl isobutyl carbinol solution with stirring. The original water and the water from the phenoxide formation was then removed by refluxing the mixture for approximately 1½ hours. Temperature at the end of the water removal step was 141° C. 90 grams (1½ moles) of dry, crystalline urea were then added to the mixture and reacted with continued refluxing at 140–150° C. until no further NH$_3$ was evolved (1½ hours). The mix was cooled to room temperature, filtered, and the filter cake washed with methyl isobutyl carbinol. Filter cake was then dried in the oven at 100° C. Wt. yield of dry cake was 97.5% of theory as NaOCN, and analyzed 97.2% NaOCN, trace percent Na$_2$CO$_3$, and 0% cyanide. NH$_3$ from the reaction was measured by absorption in standard acid and was 97.5% of theoretical. A nitrogen atmosphere was used to protect the phenol color during reaction.

(b) 141 grams of phenol and 150 grams of methyl isobutyl carbinol were mixed. 20 grams of 50% NaOH were added to the phenol solvent solution with stirring under a blanket of nitrogen. The mixture was brought to reflux and 90 grams of dry crystalline urea was added to the reaction prior to water removal. The reaction was run at reflux temperature 110° C. (initial) to 150° C. (final) until NH$_3$ evolution ceased (3 hours). Water removal was conducted simultaneously with cyanate formation. The mix was cooled, the cyanate filtered off, and the cake washed and dried. The weight yield was 97.7% of theory and analyzed 98.4% NaOCN.

(c) 162 grams (1½ moles) of cresol and 300 grams of methyl isobutyl carbinol were mixed. 89.5 grams of 94% KOH was added and the mix brought to reflux. 90 grams of urea were added and cyanate formation was conducted as in Example 4(b). The reaction mix was cooled and the cyanate filtered, washed and dried. A 98% wt. yield of 98% KOCN was obtained. No trace of cyanide appeared.

*Example No. 5.—Preparation of cyanates other than sodium and potassium cyanates*

The procedures of Example 4 were followed and the results obtained are shown below in tabular form:

CYANATES OTHER THAN SODIUM OR POTASSIUM
[Wts. in grams]

| Alkaline component | Sr(OH)$_2$.8H$_2$O | BaO | LiOH |
|---|---|---|---|
| Weight | 66.5 | 38.3 | 43.0 |
| Acidic Material | phenol | phenol | phenol |
| Weight | 47 | 47 | 47 |
| Solvent used | MIC | MIC | MIC |
| Weight | 200 | 200 | 163 |
| Urea Used | 30 | 60 | 30 |
| Temperature, Max., °C | 140 | 140 | 140 |
| Time, Hours | 3 | 3 | 3 |
| Percent Cyanate by Weight | 97 | 95 | 96 |
| Purity, Cyanate, Percent | 86.2 | 91.2 | 94.0 |
| Carbonate Content, percent | | [1] 4.2 | Nil |

[1] Carbonate contained in BaO
MIC is methyl isobutyl carbinol.

The process of this invention may be practiced as a cyclic process in which a single body of solvent with an acidic organic material, for example a phenolic material, dissolved therein is used repeatedly to promote the reaction of this invention. In such a case, the alkaline metallic hydroxide is added to the solution of phenolic compound in solvent at a temperature which drives off the water of reaction. The urea may then be added or the urea may be added with the alkaline component if the temperature at which the water is driven off is maintained below the temperature at which the urea and salt react. After the reaction is completed, the precipitated cyanate is isolated, for instance by filtration, whereby the liquid component is recovered for reuse as a solution of phenolic compound in solvent.

The process of our invention provides a distinct improvement over the methods heretofore used for the preparation of cyanates in that not even a trace of cyanide is present in the cyanates produced.

Our process is also very flexible in that cyanates can be produced very inexpensively by the dry modification if small amounts of alkali such as carbonates are not objectionable. By the solvent modification, with very little additional expense, it can be operated to produce cyanates of a higher degree of purity than have heretofore been obtainable.

Having described our invention, what we claim as new and novel is:

1. The method of preparing a cyanate selected from the group consisting of an alkali and an alkaline earth cyanate which comprises, forming a solution of urea and a salt selected from the group consisting of a phenolate and a cresolate of a metal selected from the group consisting of an alkali metal and an alkaline earth metal in a high boiling polar organic solvent which is not a solvent for said cyanates, heating said solution to a temperature substantially from 100° C. to 200° C. until the evolution of ammonia ceases, and filtering the solution to separate the cyanate from the solvent.

2. The method as set forth in claim 1 wherein said cyanate is sodium cyanate and said salt is sodium cresolate.

References Cited in the file of this patent
UNITED STATES PATENTS

| 2,381,285 | Hill | Aug. 7, 1945 |
| 2,563,044 | Kamlet | Aug. 7, 1951 |
| 2,729,541 | DePree et al. | Jan. 3, 1956 |
| 2,801,154 | DePree et al. | July 30, 1957 |